(12) United States Patent
Krause et al.

(10) Patent No.: US 11,293,856 B2
(45) Date of Patent: Apr. 5, 2022

(54) IDENTIFICATION OF ONE OR MORE SPECTRAL FEATURES IN A SPECTRUM OF A SAMPLE FOR A CONSTITUENT ANALYSIS

(71) Applicants: FRAUNHOFER-GESELLSCHAFT ZUR FÖRDERUNG DER ANGEWANDTEN FORSCHUNG E. V., Munich (DE); KARLSRUHER INSTITUT FÜR TECHNOLOGIE (KIT), Karlsruhe (DE)

(72) Inventors: Julius Krause, Karlsruhe (DE); Robin Gruna, Baden-Baden (DE)

(73) Assignees: Fraunhofer-Gesellschaft zur förderung der angewandten Forschung e.V., Munich (DE); Karlsruher Institut für Technologie (KIT), Karlsruhe (DE)

(*) Notice: Subject to any disclaimer, the term of this patent is extended or adjusted under 35 U.S.C. 154(b) by 0 days.

(21) Appl. No.: 16/762,452

(22) PCT Filed: Nov. 8, 2018

(86) PCT No.: PCT/EP2018/080683
§ 371 (c)(1),
(2) Date: May 7, 2020

(87) PCT Pub. No.: WO2019/092147
PCT Pub. Date: May 16, 2019

(65) Prior Publication Data
US 2021/0181093 A1    Jun. 17, 2021

(30) Foreign Application Priority Data
Nov. 10, 2017  (DE) .................. 10 2017 220 103.7

(51) Int. Cl.
*G01N 21/31* (2006.01)
*G01J 3/28* (2006.01)

(52) U.S. Cl.
CPC ............... *G01N 21/31* (2013.01); *G01J 3/28* (2013.01); *G01J 2003/2859* (2013.01); *G01N 2201/129* (2013.01)

(58) Field of Classification Search
CPC ...... G01N 21/31; G01N 2201/129; G01J 3/28
See application file for complete search history.

(56) References Cited

U.S. PATENT DOCUMENTS

2002/0146160 A1  10/2002 Parker et al.

FOREIGN PATENT DOCUMENTS

DE     102012217676 A1    3/2014

OTHER PUBLICATIONS

Pascal Yiou, "Data-adaptive wavelets and multi-scale singular-spectrum analysis", Feb. 14, 2000, Physica D (Year: 2000).*

(Continued)

*Primary Examiner* — Maurice C Smith
(74) *Attorney, Agent, or Firm* — Leydig, Voit & Mayer, Ltd.

(57) ABSTRACT

The invention relates to a method for identifying one or more spectral features in a spectrum (4, 5) of a sample for a constituent analysis of the sample, comprising providing the spectrum (4, 5), predefining an approximation function (6), which is a continuously differentiable mathematical function, respectively forming an (n−1)-th order derivative (7, 8, 9) of the spectrum (4, 5) and of the approximation function (6), wherein the number n>1, generating a correlation matrix (10) from the two (n−1)-th order derivatives (7, 8, 9), and respectively identifying the spectral feature or one of the spectral features in each case as a function of a local extremum (i) of the correlation matrix (10) for at least one (Continued)

Figure 1:
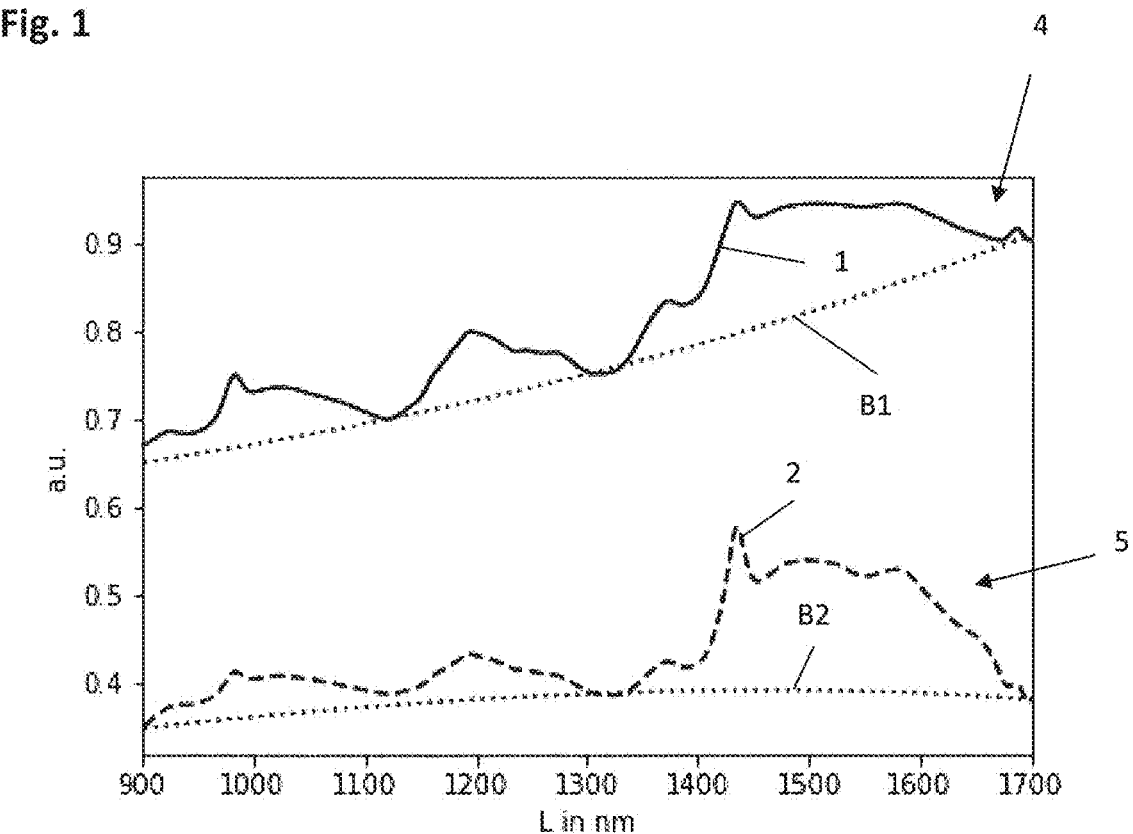

extremum (i) of the correlation matrix (10) in order to simplify the constituent analysis of the sample.

10 Claims, 7 Drawing Sheets

(56) References Cited

OTHER PUBLICATIONS

Igor A. Lavrinenko, "Second derivative analysis of synthesized spectra for resolution and identification of overlapped absorption bands of amino acid residues in proteins: Bromelain and ficin spectra in the 240-320 nm range", Oct. 31, 2019 Elsevier (Year: 2019).*

Yang et al., "Comparison of public peak detection algorithms for MALDI mass spectrometry data analysis," *BMC Bioinformatics 10*, Article No. 4 (2009) 13 pages.

European Patent Office, International Search Report in International Application No. PCT/EP2018/080683 (dated Feb. 13, 2019).

European Patent Office, Written Opinion in International Application No. PCT/EP2018/080683 (dated Feb. 13, 2019).

International Bureau of WIPO, International Preliminary Report on Patentability in International Application No. PCT/EP2018/080683 (dated May 12, 2020).

"*Multivariate Datenanalyse: für die Pharma-, Bio- und Prozessanalytik,*" (Mutivariate Data Analysis: for Pharma-, Bio-, and Process Analytics), Author: Prof. Waltraud Kessler, $1^{st}$ Edition, Oct. 2006 (cover, table of contents, preface only).

Bruce et al., "Wavelets for Computationally Efficient Hyperspectral Derivative Analysis" *IEEE Transactions on Geoscience and Remote Sensing* 39(7): 1540-1546 (2001).

Feudale et al., "Transfer of multivariate calibration models: a review," *Chemometrics and Intelligent Laboratory Systems*, 64(2): 181-192 (2002).

Fu et al., "Invariant Object Material Identification via Discriminant Learning on Absorption Features," 2006 Conference on Computer Vision and Pattern Recognition Workshop, New York, NY, USA Jun. 17-22, 2006, Piscataway, NJ, USA, 2006.

Hsu, "Spectral Feature Extraction of Hyperspectral Images using Wavelet Transform" Dissertation for Doctor of Philosophy—Department of Surveying Engineering, National Cheng Kung University, Tainan, Taiwan, pp. 1-158 (2003).

\* cited by examiner

IDENTIFICATION OF ONE OR MORE SPECTRAL FEATURES IN A SPECTRUM OF A SAMPLE FOR A CONSTITUENT ANALYSIS

CROSS-REFERENCE TO RELATED APPLICATIONS

This patent application is the U.S. national phase of International Application No. PCT/EP2018/080683, filed on Nov. 8, 2018, which claims the benefit of German Patent Application No. 10 2017 220 103.7, filed Nov. 10, 2017, the disclosures of which are incorporated herein by reference in their entireties for all purposes.

The invention relates to a device and to a method for identification of one or more spectral features in a spectrum of at least one sample for a content analysis of the sample.

Particularly in the field of analysis and quality control of foodstuffs and agricultural produce, but also in many other fields, for example in medical analyses, such as blood sugar determination, or in the field of ground analyses or analyses of bulk goods in sorting plants, optical spectroscopy is a rapid and non-destructive measuring method. A spectral sensor thereby detects a light spectrum, for example a transmission-, reflection- or emission spectrum, and converts it into a digital signal with a number N of discrete values $y(L_i)$ for the wavelengths $L_i$ with $i=1, \ldots N$. The quantity of discrete values $y(L_i)$ can then be termed spectrum Y.

By means of an analysis of the measured spectrum Y, the measured spectral signature, the dependence of the spectrum upon chemical properties of the sample can be modelled and thus the contents thereof can be determined. The model describing the dependence is also termed chemometric model. Optical spectroscopy in combination with the chemometric model enables dispensing with extensive chemical analysis methods which are generally accompanied by destruction of the sample(s). Thus, by means of optical spectroscopy, e.g. an analysis of quality, durability or quantification of contents can be implemented in normal operation, "in-line" in a production line.

However, the production of chemometric models requires a large number of different samples and measurements and is normally associated with high complexity and high costs. In order for example to determine a correlation between the germs level of minced meat with changes in the spectral signature, samples from different sources with respective different storage duration must be produced and the germ level must be determined by a reference analysis method.

In addition, analysis of the spectral signature is made difficult by superimposition of different signals of different origin. In total, a spectral signature comprises the superimposed signals of chemical and physical properties and is distorted by the surroundings, for example specific sensor properties of the spectral sensor which is used and geometric properties of the spectroscope. Factors which affect the spectral signature are consequently for example:

Chemical properties of the sample which are determined by absorption and fluorescence effects which are associated with specific excitations of electron states and molecular vibrations and thus produce a material-specific spectral signature.

Physical properties, which for example because of the sample shape, a surface property of the sample or, in the case of a sample present in powder form, depend upon a degree of grinding of the powder and also depend upon further properties.

Properties of the spectral sensor used, which for example are caused by different signal strength or different spectral measuring ranges, make difficult the comparability of measuring results of different measuring devices.

Geometric properties of the spectroscope, such as for example a variable geometry between the measured object and the sensor or the light sources and the sensor, likewise change the measured spectral signature and thus likewise make difficult the comparability of different measuring devices.

These and other disruptions or superimpositions have the result that spectral measurements with different devices, even if they are produced by the same manufacturer and belong to the same type or the same constructional series, are not identical and hence not directly comparable. This leads to the fact that chemometric models, via which from the measured spectral signature, the measured spectrum, a content analysis of the respective samples can be implemented, are generally specific to the device and cannot be used for the evaluation of measurements of other spectroscopic measuring devices. In order now to make useable spectroscopic measurements with different sensors or different devices in a data bank or to be able to develop, with respect to sensors, comprehensive analysis models, a comparability of the optical measuring data must be produced via a suitable method.

In addition, spectral sensors and hence spectroscopes produce high-dimensional data which normally have a redundancy. Consequently, for many tasks, for example identification of specific prescribed materials in a sample, the entire spectrum is not required but individual or a plurality of prescribed specific spectral features suffice. By means of the extraction of such specific features, for example the required storage space for data banks can be reduced. Methods used at present for compression and/or dimension reduction of the sensor data, such as e.g. the known primary component analysis (PCA) have the disadvantage that the interpretability of the data is lost by the respective transformation.

Previous methods for analysis of spectral signatures are, as can be deduced for example from the 2006 book which appeared from Wiley "Multivariate Datenanalyse: Für die Pharma-, Bio- and Prozessanalytik" (Multivariate Data Analysis: For Pharma-, Bio- and Process Analytics) by W. Kessler, are data-driven. The values $y(L_i)$ produce a point in an N-dimensional pattern space. The observed feature space, which is used for analysis of the contents, is generally identical to this pattern space. However, it is thereby current practice to use merely a low-dimensional sub-space of the pattern space as feature space. Frequently, a primary component analysis is used to image in the sub-space.

The feature space is then interpreted in an analysis model. For example materials and contents of the sample can be quantified by determining distance dimensions within the feature space and the definition of specific volumes. Current methods for classification are thereby inter alia support vector machines (SVM), classification with a plurality of uncorrelated decision trees, the so-called random forest method, or by means of a regression, for example PLSR regression.

If now different sensors or devices are used, then the new sensor, the secondary sensor, is compared in its properties to another sensor, the primary sensor. This requires measurements of various identical reference standards, as is described for example in the review article "Transfer of Multivariate Calibration Models: A Review" by Robert N.

Fodale et al. in Chemometrics and Intelligent Laboratory Systems 64 (2002) on pages 181-192. Also wavelet transformations for extraction of features, in particular for peak detection and also for compression of data are already known. In the context of the analysis of spectroscopic data, reference may be made here for example also to the article "Comparison of Public Peak Detection Algorithms for MALDI Mass Spectrometry Data Analysis" by Chao Yang et al., which appeared in January 2009 in BMC Bioinformatics. A further method for separation between scattering—and absorption parameters is the Kuwelka-Munk Theory. This method is based however on a plurality of measurements of one identical sample.

The object hence underlying the invention is to simplify a content analysis of a sample.

This object is achieved by the subjects of the independent patent claims. Advantageous embodiments are revealed in the dependent patent claims, the description and the Figures.

One aspect of the invention relates to a method for identification of one or more spectral features $M_i$ in a spectrum Y of at least one sample, i.e. of one or more samples, for a content analysis of the sample. The content analysis can thereby by understood in the sense of a material classification. According to the measuring structure or spectrometer, the spectrum can be or comprise a transmission spectrum and/or a reflection spectrum and/or an emission spectrum. The method thereby comprises a series of method steps.

A first method step is provision of the spectrum Y measured for the sample to a computing unit. The measured spectrum Y here represents a measured intensity I as a function of a wavelength L. A further method step is a specification of an approximation function $X_{LS}$, which is a (n−1) times continuously differentiable mathematical function, to the computing unit. The approximation function $X_{LS}$ thereby approximates an absorption—(and hence transmission—) and/or emission behaviour of the sample as a function of the wavelength L with a respective width, an absorption—and/or emission width, which is termed subsequently uniformly as blur S. For example, the absorption for a specified wavelength $L_i$ with the width S can thus be approximated by a Gaussian function with the width S which reaches its maximum at the point $L_i$. In order to make this dependency clear, the approximation function is introduced as approximation function $X_{LS}$, however is subsequently termed also as approximation function X, for the sake of simplicity.

A further method step is a respective formation of a derivative of (n−1)th degree $d^{n-1}/L^{n-1}$ of the spectrum Y, i.e. a spectrum derivative Y' and of the approximation function X, i.e. an approximation function derivative X', by the computing unit. The number n is thereby >1. The approximation function X and also the spectrum Y are therefore respectively often the same, namely derived n−1 times according to the wavelength L. This has the effect that multiplicative wavelength-dependent proportions are corrected up to the (n−1)th order. Here, the knowledge underlying the invention is that the offset or the so-called baseline of the spectrum Y is produced by scattering effects, these therefore concerning a multiplicative influence which can be described by a smooth function of the order n. This is based on the knowledge that a signal strength which detects the measured intensity and depends upon the geometry of the spectroscope used is proportional to $1/d^2$ by the inverse square law, d describing the distance between sensor and sample or sample and light source. Thus also influences of the object size, i.e. for example a grain size or a grinding degree or a surface structure, can be represented likewise as multiplicative factors proportional to $r^n$ or $L^n$, r being a value for the object size and L the wavelength. The number n which determines the degree of the derivative to be formed can be derived for example from the Mie Theory from which a maximum value of n=6 or n=12 can arise. Basically, it applies here that with higher derivatives also a noise component is amplified, for which reason, as described also in more detail further on, generally as small values as possible are chosen for n. In practice, the choice of n<5, preferably n=2 or 3, has proved here to be particularly advantageously suitable.

A further method step is production of a correlation matrix from the two derivatives of (n−1)th degree X', Y' for specified wavelengths L and specified blurs S by the computing unit. By producing the correlation matrix, the high-dimensional pattern space from the state of the art is replaced by a two-dimensional feature space. The correlation matrix hence represents a feature map in which one or more spectral features $M_i(L_i, S_i)$ at the places determined by the respective wavelength $L_i$ and blur $S_i$ define contents of the sample, as explained more subsequently. The correlation matrix hence describes a correlation between the derivative X' of the approximation function X and the derivative Y' of the spectrum Y, as a function of wavelength(s) L and blur(s) S. Since the matrix can also be occupied thinly, i.e. can consist for example for the most part of zeros, such a matrix can also consist of a quantity of three-tuples $(L_i, S_i, X'*Y')$, $X'*Y'$ being able to be the value of the correlation matrix at the location $(L_i, S_i)$. For example, the value of the correlation matrix can be determined by a wavelet transformation or the scalar product <X'|Y'>. Correspondingly, the matrix term present within the scope of this document, comprises not only a standard nxm matrix but also a quantity of three-tuples which is suitable for describing such a matrix with the assumption that the latter consists for the most part of zeroes.

A further method step is now a respective identification of the spectral feature $M_i$ or one of the spectral features $M_i$ as a function respectively of a local extremum i of the correlation matrix for at least one extremum i of the correlation matrix, preferably a plurality or all of the extrema i of the correlation matrix. At least to one, preferably however to a plurality or else to all of the extrema i of the correlation matrix, hence (precisely) one spectral feature $M_i$ is assigned. The features $M_i$ are hence specific points or landmarks in the two-dimensional space for features, which is spanned by the wavelength L and the blur S. The feature $M_i$ or the quantity of features $M_i$ hence represents the spectral signature for material classification. As explained more further on, also a quantitative content determination can be implemented by means of the mentioned features $M_i$. The described method hence provides robust identification of features in spectral data which are invariant or physical properties of the sample, sensor properties of the spectral sensors used and a geometry of the spectroscope used.

The described procedure hence entails a whole series of advantages. Firstly, the spectral features $M_i$ and hence also the spectral data can be represented, able to be interpreted simply visually. Hence, also prognoses for the spectral areas and resolutions required for the analysis can be made, for example a simpler, more robust sensor can be used in a manufacturing line when only a few features $M_i$ suffice in a prescribed spectral range for the content analysis of the sample. The described feature space is in addition universally usable, a device-specific transfer protocol for making data of a device comparable with data of another device is hence not required. It is hence possible for local patterns in the feature space to be identified for the classification and to be used in different devices or sensors. If for example a different sensor is thus used with a different recording range, it suffices to calculate the respectively suitable section of the correlation matrix.

Since the respective position $L_i$ and blur S of a feature $M_i$ represents physical dimensions of the sample and hence are invariant relative to the measuring device used, and also the signal strength, i.e. a geometry of the spectroscope does not influence these dimensions, the described method provides a unifying preprocessing of the measuring data which can be used advantageously in machine learning methods on the basis of their interpretability. Hence chemometric models based on the described features $M_i$ can be used in the surroundings of mobile sensors and in hyper-spectral imaging for classification or for regression.

The dimensional reduction produced in the method reduces the number of samples required for producing a model for different contents. Also the spectroscopic data are greatly correlated precisely in the range of the ultraviolet, visible and infrared spectrum so that the correlation matrix is particularly meaningful. Furthermore, the proposed method has the advantage that local maxima of the correlation matrix show absorption features which are linked approximately via Lambert's Law to the quantitative quantity of the respective contents and thus also enable a quantitative analysis of the contents, as explained more further on.

The described aspect can therefore concern a method for identification of one or more spectral features in a spectrum of a sample for a content analysis of the sample, having the method steps:
  a) provision of the spectrum measured for the sample;
  b) specification of an approximation function which is a continuously differentiable mathematical function and approximates an emission behaviour of the sample as a function of the wavelength L with a blur S;
  c) respective formation of a derivative of (n−1)th degree of the spectrum and of the approximation function, the number n being >1;
  d) production of a correlation matrix from the two derivatives of (n−1)th degree, which describes a correlation between the derivative of the approximation function and the derivative of the spectrum as a function of wavelength L and blur S; and
  e) respective identification of the spectral feature or of one of the spectral features as a function respectively of a local extremum (i) of the correlation matrix for at least one extremum (i) of the correlation matrix,
    wherein optionally in the identification as a function of the local extremum (i) of the correlation matrix, the respective feature can be identified by coordinates of the extremum (i) in a wavelength-blur-space determined by the correlation matrix.

The method is hence suitable, in an altogether outstanding way, for analysing spectroscopic data. Comparable data sets can be produced for analysis with different measuring devices. Since the method extracts chemical features independently of external influences, it is suitable particularly well for analyses of reflectance and transmission, preferably in the ultraviolet, visual and/or infrared spectrum, with mobile spectrometers, for example so-called low-cost spectrometers, and in hyper-spectral imaging. Application areas, given by way of example, are food scanners in the foodstuffs sphere, ground analyses in the agricultural sector, sorting plants for bulk goods and blood sugar analyses in the medical field. In addition, the method is suitable for structuring a spectral data bank to be visually interpretable and thus to define for example a standard for storing spectral data.

In an advantageous embodiment, it is thereby provided that production of the correlation matrix comprises or is a calculation of a scalar product $<X'|Y'>$ of the two derivatives of (n−1)th degree X' and Y' and/or implementation of a wavelet transformation of the derivative of (n−1)th degree Y' of the spectrum Y with the derivative of (n−1)th degree X' of the approximation function X as wavelet. The wavelet transformation can comprise or be a discrete or continuous wavelet transformation. The scalar product can thereby comprise or be the standard scalar product or Euclidian scalar product. The value of the correlation matrix at the point $L_i$, $S_i$ is in this case calculated by the scalar product $<X'_{Li,Si}|Y'>$ and can be produced then, with low computing complexity, by a single vector multiplication and subsequent N times addition. The N inputs of the vector Y' are thereby formed by the derivative of the spectrum Y (present as vector) in vector form. The intensities of the N measuring points of the spectrum Y are thereby the inputs of the spectrum Y present as vector. The derivative X' present in the form of a vector can be produced by corresponding scanning or sampling of the analytical derivative X' of the approximation function X at N points. Since advantageously, the approximation function X has the same form with the given $S_i$ for all $L_i$, for example a Gaussian function with maximum at the respective $L_i$, and is displaced for different $L_i$ only along the wavelength L, a value is thus provided by the scalar product which correlates with the presence of a (here Gaussian) maximum (with the blur $S_i$) at the point $L_i$.

This has the advantage of a smoothing effect since, for calculating the inputs of the correlation matrix which are also termed respective correlation length, for example correlation length $<X'_{Li,Si}|Y'>$, a large number (<N) of spectral data is used since, for each individual input, the total spectrum Y or at least more than one measuring value y of the spectrum Y is evaluated. The use of the scalar product for producing the correlation matrix hence provides a particularly robust and computing-capacity-saving representation of the desired features $M_i$. The use of wavelet transformations entails particularly good flexibility.

In a further advantageous embodiment, it is provided that the formation of the derivatives X' and Y' and/or the production of the correlation matrix is implemented many times for different numbers n. In particular, the formation of the derivatives X' and Y' can be implemented in succession for rising numbers n. Preferably, this is effected until the derivative Y' of the spectrum Y and/or the derivative X' of the approximation function X and/or the correlation matrix no longer fulfil a specified quality criterion. For example, the formation of the derivatives can be implemented until a smoothing degree of the derivative Y' is no longer fulfilled and/or a specified signal-to-noise ratio of the derivative Y' is no longer reached. The identification is effected then as a function of the local extremum i or the local extrema i of that correlation matrix which is assigned to the highest number n and for which the quality criterion is still fulfilled by the derivative Y' of the spectrum Y and/or the derivative X' of the approximation function X and/or the correlation matrix. For example, the identification can thus be effected as a function of the correlation matrix for which the corresponding derivative Y' of the spectrum Y still exceeds a specified signal-to-noise ratio.

This has the advantage that the offset present concretely in the spectrum and also further multiplicative influences which are present concretely can always be compensated for without the number n requiring to be established in advance. By specifying respective quality criteria which can be checked automatically also, for example according to specifications stored in the computing unit, the best-possible correlation matrix and hence the most reliable features $M_i$ can thus also be calculated always in a fully automatic way.

In another preferred embodiment, it is provided that the approximation function Y is specified such that the derivative of (n−1)th degree Y' of the approximation function Y is average-free, i.e. with zero-mean. In particular, the approximation function can be prescribed as Gaussian function or Lorentzian function with a specified blur S. There can be understood here under average-free that the integral over the derivatives X' from minus infinity to plus infinity is zero.

This has the advantage that, with the average-free definition of the derived approximation function and hence in particular also of the wavelets, disappearance of a further moment is achieved so that, with the (n−1)th derivative, in fact the multiplicative correction of nth order of the spectrum is achieved. Hence for example also an improved signal-to-noise ratio and consequently a more precise identification of the features is achieved.

In a further particularly advantageous embodiment, it is provided that the local extremum i and the local extrema i during identification comprise or are respectively local maxima. Alternatively, the extrema used during the identification can also comprise local maxima and local minima, which enables an increase in the number of features and hence potentially a more precise content analysis.

The choice of maxima, in particular the exclusive choice of maxima, entails however the advantage of very reliable features and hence a very precise content analysis with relatively few features and consequently with reduced computing complexity since it has been shown that the maxima (compared with the minima) are particularly suitable for identification of the features.

In a further advantageous embodiment, it is provided that, during identification, the respective feature $M_i$, as a function of the local extremum i of the correlation matrix, is identified by coordinates ($L_i$, $S_i$) of the extremum i in a wavelength-blur space, determined by the correlation matrix, which can also be termed map. In particular, a characteristic degree X'*Y' can be assigned here to at least one feature $M_i$, preferably to all features $M_i$, which characteristic degree is determined by the value of the extremum i. For example, the characteristic degree can be determined by the correlation length or by the above-mentioned scalar product $<X'_{Si, Li}|Y'>$.

The wavelength-blur space has proved to be particularly suitable for the desired robust features $M_i$. Since the correlation length which can be given in particular by the scalar product $<X'|Y'>$ is linked approximately via the Beer-Lambert law to the quantitative quantity of the contents, thus not only a content analysis in the sense of a material classification but also in the sense of a quantitative content determination can be achieved via the features $M_i$.

In a further advantageous embodiment, it is provided that the spectrum is or comprises an untreated measured spectrum, a so-called raw spectrum. Alternatively, the measured spectrum can also be or comprise a smoothed measured spectrum which is produced from an untreated spectrum by a smoothing—and/or filter—and/or scaling method, and preferably by no other or further treatment steps.

Precisely in the case of untreated measured spectra, the described method has proved to be particularly advantageous since important information here which is lost during treatment steps which are normal or known in the state of the art otherwise, are retained and thus the identified features enable a particularly precise content analysis.

In a particularly advantageous embodiment, it is provided that, as further method step, the identified feature or the identified features in the spectrum for the sample are compared with one or more reference feature(s) stored in the computing unit, and, by means of a feature comparison result, at least one content present in the sample is identified. Hence by means of the feature comparison result, the sample or the material or the materials of the sample can hence be classified. Preferably, for the identified features, also the respective characteristic degrees are thereby compared with one or more corresponding reference characteristic degrees and, by means of a characteristic degree comparison result, a quantity, preferably a relative quantity of the content in the sample, is quantified. By means of the characteristic degree reference result, a quantitative content determination of the sample can hence be implemented.

This has the advantage that the sample can also be analysed particularly precisely quantitatively with respect to the content thereof corresponding to the advantages described above for the other embodiments.

In a further advantageous embodiment, it is provided that the number n is >2. For these larger numbers n, it has been established that particularly good results are achieved.

A further aspect of the invention relates also to a device for identification of one or more spectral features $M_i$ in a spectrum Y of a sample for a content analysis of the sample, which device has a computing unit. The computing unit is thereby configured to produce, from a provided spectrum Y and a specified approximation function X, which is a continuously differentiable mathematical function, respectively a derivative of (n−1)th degree Y', X' of the spectrum Y and of the approximation function X, the number n being >1. Furthermore, the computing unit is configured to produce a correlation matrix from the two derivatives of (n−1)th degree X', Y' and, for at least one local extremum i of the correlation matrix as a function of the respective local extremum I of the correlation matrix, to identify respectively the spectral feature $M_i$ or one of the spectral features $M_i$.

Advantages and advantageous embodiments of the device correspond here to advantages and advantageous embodiments of the described method.

The features (or characteristics) and feature combinations, mentioned above in the description, and also the features and feature combinations mentioned subsequently in the description of the Figures and/or shown solely in the Figures are not only useable in the respectively indicated combination but also in other combinations without departing from the scope of the invention. Hence also embodiments of the invention which are not shown explicitly and explained in the Figures, but emerge and are producible by separate feature combinations from the explained embodiments, should be regarded hence as included and disclosed. Also embodiments and feature combinations which hence do not have all the features of an originally formulated independent claim should be regarded here as disclosed. Furthermore, embodiments and feature combinations, which go beyond the feature combinations set out in the references of the claims or deviate from these should be regarded as disclosed, in particular by the above-demonstrated explanations.

Figure 2:
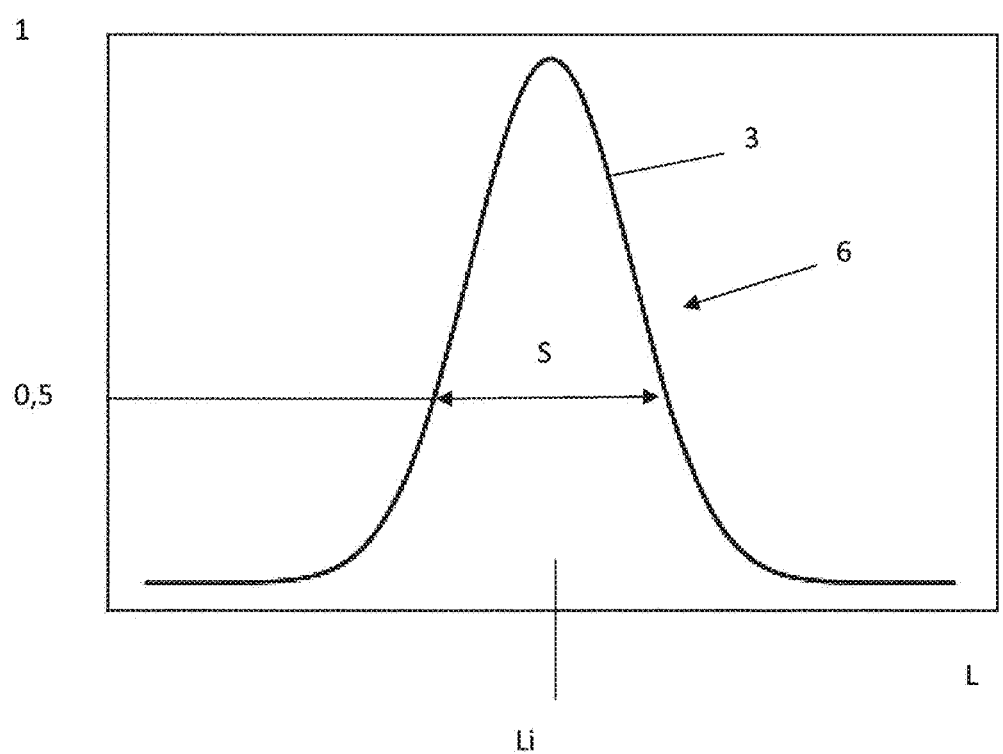
Figure 3:
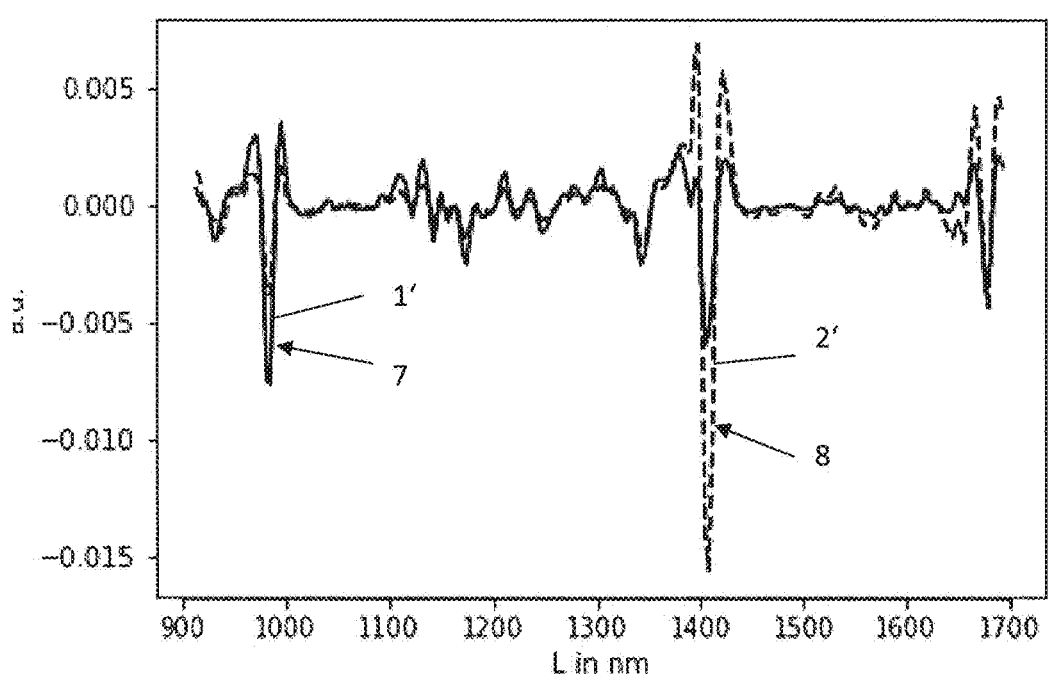
Figure 4:
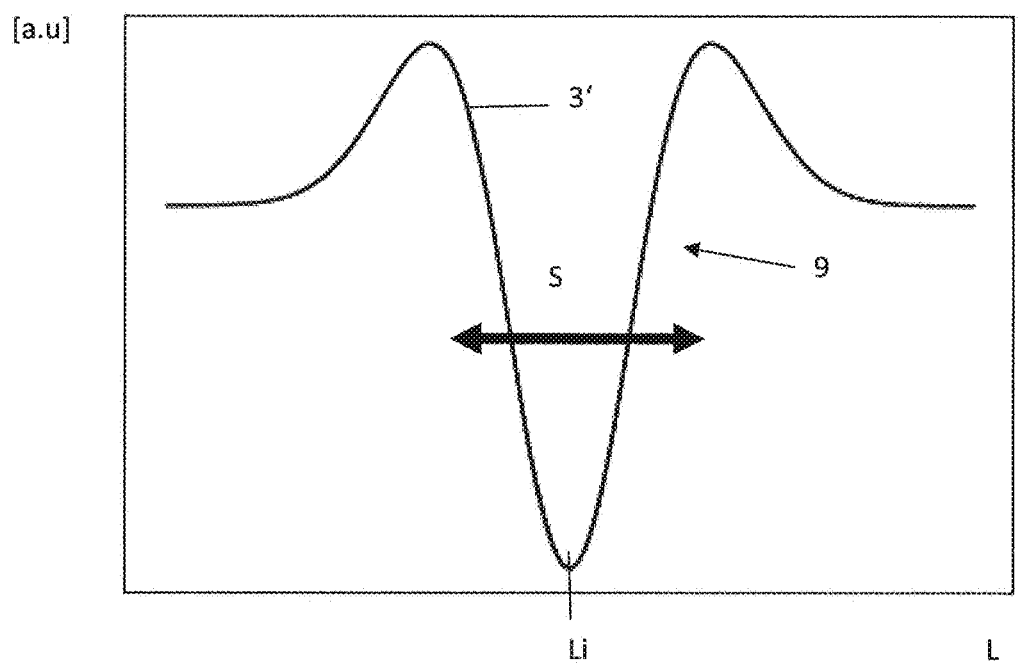
Figure 5:
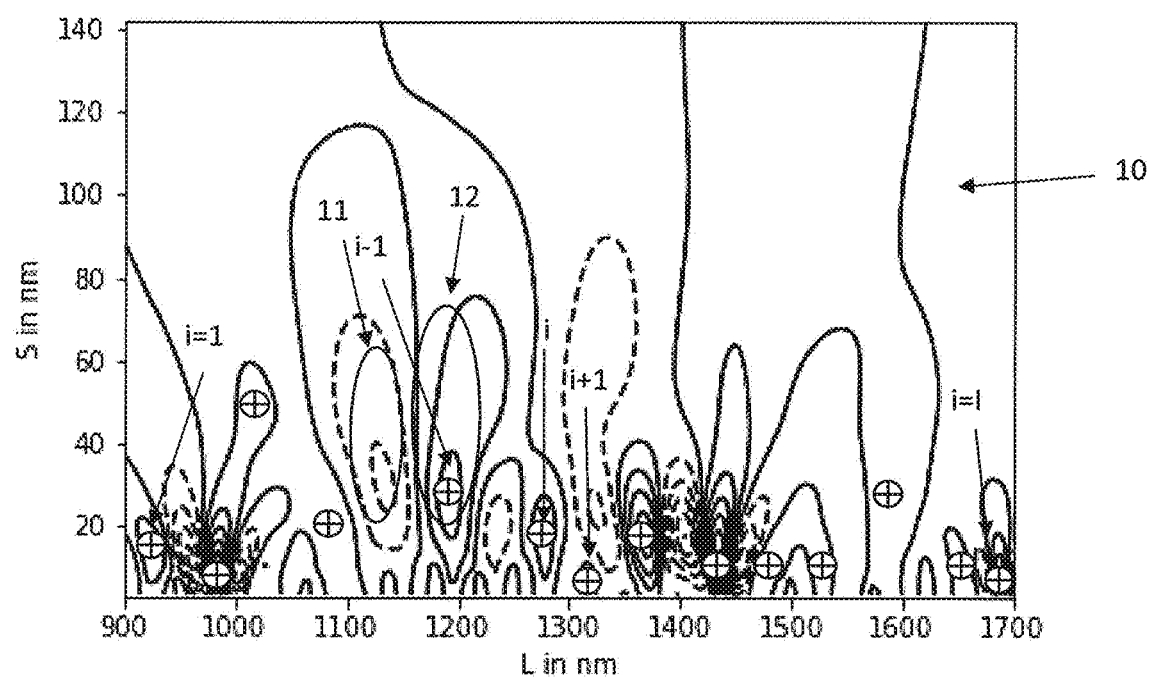
Figure 6:
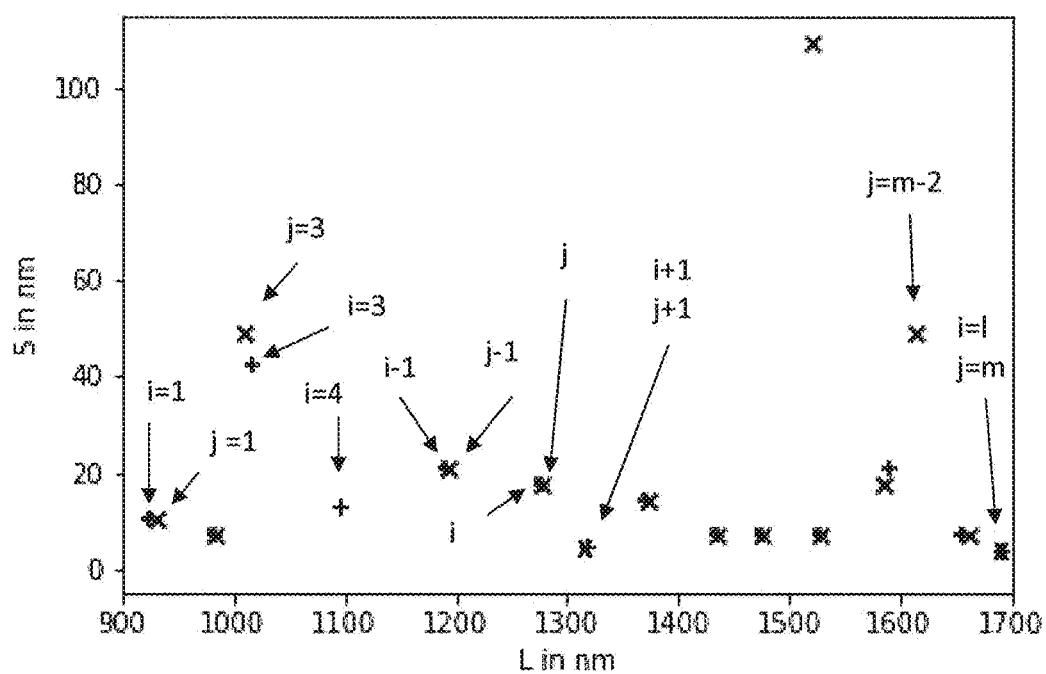

Embodiments of the invention are explained in more detail with reference to schematic drawings. There are thereby shown:

FIG. 1 an illustration of two spectra, given by way of example, of chemically identical substances;

FIG. 2 an approximation function, given by way of example;

FIG. 3 an illustration of derivatives, given by way of example, of the spectra from FIG. 1;

FIG. 4 a derivative of the approximation function of FIG. 2 corresponding to the derivatives illustrated in FIG. 3;

FIG. 5 a correlation matrix, given by way of example, produced from the derivates shown in FIG. 3 and FIG. 4 at present with calculation of a scalar product, said correlation matrix having the identified spectral features;

FIG. 6 a comparative illustration of features identified for the two spectra from FIG. 1.

Figure 7:
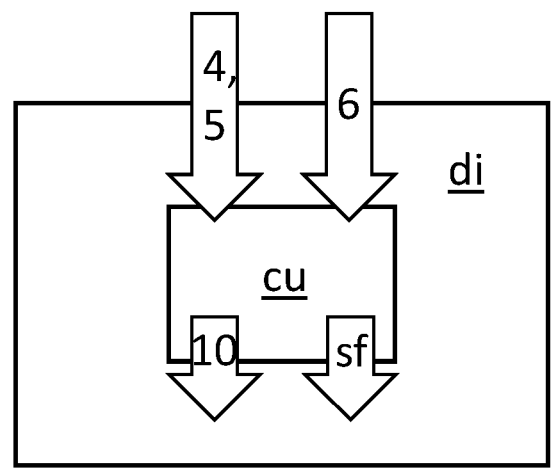

FIG. 7 shows a device "di" for identification of spectral features with a computing unit "cu" which produces a correlation matrix 10 and identifies spectral features "sf" based on a spectrum 4, 5 and an approximation function 6.

In FIG. 1, with a first curve 1, a spectrum 4, at present a reflection spectrum of sugar is plotted as intensity in arbitrary units [a.u.] over the wavelength L in nanometres. A further curve 2 here illustrates analogously a second spectrum 5, here a reflection spectrum of powdered sugar as a function of the wavelength. The two curves 1, 2 are clearly offset relative to each other here, thus the first curve in the wave range of 900 to 1,700 nm assumes reflection values between approx. 0.65 and 0.95, whereas the second curve 2 reaches merely reflection values between approx. 0.35 and 0.55. Correspondingly, both curves 1, 2 are difficult to compare.

In addition to the two curves 1, 2 also two offset curves B1, B2 which belong respectively to the curve 1 or 2 are illustrated. Both offset curves B1, B2 represent a multiplicative influence on the illustrated spectra 4, 5, presently the reflectivity of the corresponding samples, and can be described by a smooth function of the respective order n, for example by a polynomial. The curve 1 and hence offset curve or baseline B1 assigned to the sugar assumes presently values between 0.65 and 0.9 for its reflectivity and the second offset curve B2 which is assigned to curve 2 and hence to the powdered sugar assumes values between approx. 0.35 and 0.38.

The spectrum 4 of the sugar and also the spectrum 5 of the powdered sugar can now be prepared respectively in a first method step on a computing unit.

In FIG. 2, an approximation function 6 which is specified as continuously differentiable mathematical function, is illustrated as curve 3. The curve 3 is thereby plotted over the wavelength L as intensity in arbitrary units. At present, the approximation function 6 is a Gaussian function which is centred about the wavelength $L_i$ (or equally $L_j$) and a specified blur S which, in the present case, indicates the half-value width (full-width-half-maximum) of the curve 3 about the wavelength $L_i$.

In FIG. 3, now two further curves 1', 2' are illustrated over the wavelength L of 900 to 1,700 nm. Both curves 1', 2' concern derivatives of (n−1)th degree 7, 8 of the curves 1, 2 shown in FIG. 1. These are plotted respectively in arbitrary units [a.u.]. Since in the present case n=3 is chosen, the first curve 1' hence illustrates the second derivative 7 of the curve 1 from FIG. 1 according to the wavelength L and the second curve 2' represents the second derivative 8 of the curve 2 from FIG. 1. Hence, the multiplicative proportion in the order up to the nth order is corrected as presently the second order. Correspondingly, the two curves 1', 2' are now situated almost one above the other, the offset curves B1, B2 from FIG. 1 are correspondingly no longer illustrated.

The derivative of the 2nd degree 9 formed starting from the approximation function 6 is illustrated in FIG. 4 by curve 3'. This is presently likewise plotted in arbitrary units (a.u.) over the wavelength L. Starting from the Gaussian function chosen here as approximation function 6, a rotated, so-called Mexican hat profile is produced presently.

In FIG. 5, a correlation matrix 10 which was produced from the two derivatives 7, 9 is now illustrated, by a scalar product of the two derivatives 7, 9 being calculated. This scalar product was implemented here for all of the previously defined wavelengths L and blurs S, presently therefore for the wavelengths from 900 to 1,700 nm and the blur from 0 to 140 nm. The values of the correlation matrix 10 at the coordinates $(L_i, S_i)$ hence correspond respectively to the calculated scalar product and can also be termed correlation length.

For at least one, preferably several or however all of the extrema i, of the correlation matrix 10, preferably all the maxima of the correlation matrix 10, now one or more spectral features $M_i$ is identified. At present, the extrema i are chosen here as maxima so that the features are given at present in the two-dimensional feature space 1 $M_i=(L_i; S_i)$ with i=1, . . . I are given. These features $M_i$ include the spectral signature for the content analysis of the sample, i.e. for the material classification. For better understanding, respectively one region 11, by way of example, about a local minimum and a further region 12 about a local maximum, the extremum i−1 is illustrated.

In the illustrated example, the respective maxima are illustrated as extrema i for sugar. For example, via a comparison of the features $M_i$ of the sugar spectrum 4 with stored reference features, the chemical identity belonging to the first spectrum 4 can be demonstrated. For this purpose, for example also respective tolerance values can be specified, which specify a maximum deviation of the identified features $M_i$ with the stored reference features. If also a quantitative content determination is provided, then the features $M_i$ with $M_i=(L_i, S_i, X'*Y')$ can be specified, $X'*Y'$ being the scalar product of the derivative 7 of the spectrum 4 and of the derivative 9 of the approximation function 3, and i=1, . . . I. A larger scalar product $X'*Y'$ or a larger correlation length at a specified extremum i indicates here, because of the Beer-Lambert law, a larger quantity of content in the sample, a smaller scalar product $X'*Y'$ or a smaller correlation length to a smaller quantity.

In FIG. 6, the extrema i of FIG. 5 chosen as maxima and also in addition the extrema j chosen as maxima, which were derived analogously to the extrema i from the powdered sugar spectrum 5, are illustrated in a wavelength-blur space (L-S space). Since a large number of extrema i, j are situated one above the other (for example for (i; j)=(2; 2), (i−1; j−1), (i+1; j+1), . . . (l; m)) or are situated in a specified environment from each other (for example for (i; j)=(1; 1), (i; j), (l−1; m−1)), the chemical identity of the two samples can be demonstrated via a comparison of the features $M_i$ of the first (sugar) spectrum 4 with the features $M_j$ of the second (powdered sugar-) spectrum 5 as reference features. For definition of the specified environment, for example also respective tolerance values which determine a maximum deviation of the features $M_i$ with the features $M_j$ can be specified.

The invention claimed is:

1. A method for identifying one or more spectral features in a spectrum of a sample for a content analysis of the sample, the method comprising:
   a) providing a spectrum;
   b) specifying an approximation function which is a continuously differentiable mathematical function;
   c) forming a derivative of (n−1)th degree of the spectrum and forming a derivative of (n−1)th degree of the approximation function, the number n being >1;
   d) producing a correlation matrix from the two derivatives of (n−1)th degree; and
   e) respectively identifying the spectral feature or of one of the spectral features as a function of a respective local extremum (i) of the correlation matrix for at least one extremum (i) of the correlation matrix.

2. The method according to claim 1, wherein the correlation matrix is produced by a method comprising calculating a scalar product of the two derivatives of (n−1)th degree and/or implementing a wavelet transformation of the derivative of (n−1)th degree of the spectrum with the derivative of (n−1)th degree of the approximation function as wavelet.

3. The method according to claim 1, wherein the forming of the derivatives according to step c) and/or producing of the correlation matrix according to step d) is implemented many times for different numbers n, and identifying according to step e) is effected as a function of the local extremum (i) or of the local extrema (i) of that correlation matrix which is assigned to the highest number n for which the quality criterion is still fulfilled by the derivative of the spectrum or the derivative of the approximation function or the correlation matrix.

4. The method according to claim 1, wherein the approximation function is specified such that the derivative of (n−1)th degree of the approximation function is average-free.

5. The method according to claim 1, wherein the local extremum (i) or the local extrema (i) during identification according to method step e) comprise respectively local maxima.

6. The method according to claim 1, wherein, during identification, the respective feature, as a function of the local extremum (i) of the correlation matrix, is identified, according to method step e), by coordinates of the extremum (i) in a wavelength-blur space, determined by the correlation matrix.

7. The method according to claim 1, wherein the spectrum is or comprises an untreated, measured spectrum.

8. The method according to claim 1, which further comprises a step wherein the feature(s) identified in the spectrum for the sample are compared with one or more reference features stored in a computing unit, and, by means of a feature comparison result, at least one content present in the sample is identified.

9. The method according to claim 1, wherein the number n is >2.

10. A device for identifying one or more spectral features in a spectrum of a sample for a content analysis of the sample, having a computing unit, wherein the computing unit is configured to produce, from a provided spectrum and a specified approximation function, which is a continuously differentiable mathematical function, a derivative of (n−1)th degree of the spectrum and a derivative of (n−1)th degree of the approximation function, the number n being >1;

and furthermore the computing unit is configured to produce a correlation matrix from the two derivatives of (n−1)th degree, and, for at least one local extremum (i) of the correlation matrix, as a function of the respective local extremum (i) of the correlation matrix, to identify respectively the spectral feature or one of the spectral features.

* * * * *